(12) United States Patent
Serpelloni

(10) Patent No.: US 6,767,576 B2
(45) Date of Patent: Jul. 27, 2004

(54) SUGAR-FREE CONFECTIONERY

(75) Inventor: Michel Serpelloni, Beuvry-les-Bethune (FR)

(73) Assignee: Roquette Freres, Lestrem (FR)

( * ) Notice: Subject to any disclaimer, the term of this patent is extended or adjusted under 35 U.S.C. 154(b) by 0 days.

(21) Appl. No.: 10/112,278

(22) Filed: Mar. 29, 2002

(65) Prior Publication Data

US 2002/0192343 A1 Dec. 19, 2002

(30) Foreign Application Priority Data

Mar. 30, 2001 (FR) .............................. 01 04418

(51) Int. Cl.$^7$ ................................................ A23G 3/00
(52) U.S. Cl. ...................... 426/658; 426/548; 426/659; 426/660
(58) Field of Search ................ 426/548, 658, 426/659, 660

(56) References Cited

U.S. PATENT DOCUMENTS

| | | | |
|---|---|---|---|
| 4,097,616 A | | 6/1978 | Guillou et al. |
| 4,238,475 A | | 12/1980 | Witzel et al. |
| 4,597,981 A | | 7/1986 | Kastin |
| 4,963,359 A | | 10/1990 | Haslwanter et al. |
| 5,030,460 A | * | 7/1991 | Baggerly .................... 426/103 |
| 5,462,760 A | | 10/1995 | Serpelloni et al. |
| 6,444,252 B1 | * | 9/2002 | Gordon et al. .............. 426/573 |

FOREIGN PATENT DOCUMENTS

| | | |
|---|---|---|
| EP | 0 377 278 | 7/1990 |
| EP | 1006128 A1 * | 12/1999 |
| WO | WO 95 02969 | 2/1995 |

OTHER PUBLICATIONS

Derwent abstract of EP 1 006 128 A.
Patent abstract of Japan of JP 10 117704 A.
Patent abstract of Japan of JP 04 35 6169 A.
Derwent abstract of ES 2 078 186 A.

* cited by examiner

Primary Examiner—Leslie Wong
(74) Attorney, Agent, or Firm—Sturm & Fix LLP

(57) ABSTRACT

The invention relates to a sugar-free confectionery, characterized in that it comprises a sweetening mass comprising branched maltodextrins having between 15 and 35% of 1→6 glucoside linkages, a reducing sugar content of less than 20%, a polymolecularity index of less than 5 and a number-average molecular mass Mn at most equal to 4500 g/mol and at least one polyol chosen from the group consisting of erythritol, mannitol and maltitol, the said branched maltodextrins constituting from 0.5 to 75% of the sweetening mass, and the said polyol constituting at most 13.5% and preferably at most 10% of the sweetening mass which it comprises.

5 Claims, No Drawings

SUGAR-FREE CONFECTIONERY

FIELD OF THE INVENTION

The present invention relates to a novel confectionery obtained using an appropriate quantity of branched maltodextrins in combination with at least one polyol.

BACKGROUND OF THE INVENTION

Nowadays, as regards confectionery products and sweetmeats, it appears that new strong consumer trends are appearing. Notions of nutritional balance and healthy lifestyle are, consciously or otherwise, taken into account in current diets. Although the enjoyment of what is sweet is still very strong, a good number of consumers wish to avoid the problems linked to the consumption of sugars. It is for this reason that confectionery manufacturers have been led to develop sugar-free combinations in which polyols, sometimes called sugar alcohols, are rightly used because of their harmlessness towards the teeth and of their reduced calorific value compared with sucrose.

One of the great difficulties from which formulators of sugar-free confectionery products cannot escape is that of successfully manufacturing products which are in every respect similar to traditional products to the extent that it is difficult to tell them apart, this being without having to substantially alter or complicate the plants and the procedures in place in industries. This is also true of the confectionery products which are the subject of the present invention.

Various documents reporting active research studies in this field are known. There may be mentioned in particular:

- the documents U.S. Pat. Nos. 4,597,981 and 4,323,359 both relating to sugar-free soft confectionery products containing gelatin.
- the document FR-A-2,338,651 in which there is claimed a novel process for manufacturing soft sweets having a crystalline structure. This process is equally suitable for the production of conventional products and sugar-free products. Mannitol is cited among the numerous possible sugar substitutes, but xylitol, which is preferred because of the sensation of freshness which it produces in the mouth, is used as sole and only substitute for mixtures of sugar and glucose syrup. The applicants have observed that this is not possible with mannitol.
- the document EP-A-377,278 relating to a dietetic sweetening composition, in which grained chewy pastes are described, also containing xylitol. The latter still represents at least 38% of the sweetening mass, which, given its price on the market, tends to dissuade industrialists from its use in such an application. Moreover, the products obtained which are the most advantageous from the point of view of their texture and their stability require very high cooking temperatures, in the region of 165° C., but also the maturation of the massecuite overnight before being worked again. It can be understood why an industrial implementation of such a process can be very delicate.
- the document EP-A-0,630,573 describing sugar-free aerated and grained confectionery products, free of cellulosic compounds derived from cellulose, comprising a polyol chosen from mannitol and erythritol, the said polyol constituting from 13.5 to 28% of the sweetening mass of the said confectionery.

There are therefore currently no technically or economically viable solutions allowing the manufacture of sugar-free confectionery products having the qualitative characteristics set out above.

SUMMARY OF THE INVENTION

On the strength of this acknowledged fact, the applicants set out to remedy this deficiency while setting themselves the essential objective of reducing as much as possible the quantities of polyols to be used in the preparation of such confectionery products. This is justified for reasons of a technical nature linked to ease of manufacture but also of an economic and metabolic nature, that is to say in particular of digestive tolerance. Furthermore, it is particularly advantageous to limit as much as possible the incorporation of polyols which indeed contain fewer calories than sugar, but contain more calories than other bulking agents which may also enter into the formulation of such confectionery products, such that, if desired, a substantially higher calorie reduction can thus be obtained.

Finally, it is also possible to envisage, by virtue of the use of the small quantity of polyols, the introduction of substances with advantageous nutritional or pharmacodynamic properties such as, in the case of the present invention, branched maltodextrins, in a nonnegligible quantity.

It is after many trials that the applicants have had the merit to observe, surprisingly and unexpectedly, that the combination of branched maltodextrins and certain polyols made it possible to prepare sugar-free confectionery products which are very well tolerated, optionally having a low calorific value, an excellent stability and an adaptable texture, at a rate of use, expressed relative to the sweetening mass present in confectionery products, which is particularly low and in particular lower than that described in the document EP-A-0,630,573.

DETAILED DESCRIPTION OF THE INVENTION

The subject of the invention is therefore a sugar-free confectionery, characterized in that it comprises a sweetening mass comprising branched maltodextrins having between 15 and 35% of 1→6 glucoside linkages, a reducing sugar content of less than 20%, a polymoleculariy index (ratio of weight-average molecular mass over number-average molecular mass) of less than 5, and a number-average molecular mass Mn at most equal to 4500 g/mol, and at least one polyol chosen from the group consisting of erythritol, mannitol, isomalt, lactitol and maltitol, the said branched maltodextrins constituting from 0.5 to 75% of the sweetening mass.

The expression "branched maltodextrins" is understood to mean, for the purposes of the present invention, the maltodextrins described in the document EP-A-1,006,128 and in its U.S. counterpart (U.S. Ser. No. 09/455,009), of which the assignee is proprietor. The entire content of U.S. Ser. No. 09/455,009 is herein incorporated by reference. These branched maltodextrins have an indigestibility character which has the consequence of reducing their calorific value, by preventing their assimilation in the small intestine. Their low content of molecules having a low degree of polymerization ("DP") also contributes to their low calorific value. Their high content of 1→6 glucoside linkages has the consequence of reducing their cariogenic power by reducing their assimilation by the microorganisms of the buccal cavity. This high level of 1→6 linkages also confers quite special prebiotic properties on them: it has indeed appeared that the bacteria of the cæcum and of the colon in humans and animals, such as butyrogenic, lactic or propionic bacteria, metabolize highly branched compounds. Moreover, these branched maltodextrins promote the development of bifidogenic bacteria to the detriment of undesirable bacteria. This results in properties which are quite beneficial to the health of the consumer.

According to a preferred variant of the present invention, the said branched maltodextrins have a reducing sugar content of between 2 and 5% and an Mn of between 2000 and 3000 g/mol and may be completely or partially hydrogenated.

Advantageously, the polyol of the sweetening mass of the confectionery in accordance with the present invention, that is to say erythritol and/or mannitol and/or isomalt and/or lactitol and/or maltitol, constitutes at most 13.5%, and preferably at most 10% of the sweetening mass which it comprises, considered in the dry state.

The exact content of erythritol, mannitol, isomalt, lactitol or maltitol will vary with the nature of the confectionery manufactured, but also according to the final texture desired. The latter may be adjusted by the choice of the other ingredients and by the water content of the confectionery.

In general, given that, for example, the solubility of maltitol is greater than that of erythritol, which is itself greater than that of mannitol, the quantities of maltitol to be introduced in order to obtain a confectionery in accordance with the invention having a short texture will be greater than those of erythritol, which will be greater than those of mannitol.

It is also possible to combine mannitol and erythritol in order to control the crystallization of one of them by the other. In this case, the preferred contents of these polyols will also be less than 13.5% relative to the total sweetening mass of the confectionery, considered on a dry basis.

The optimum content of mannitol or erythritol can be easily determined by persons skilled in the art by a few routine tests according to whether their industrial plant allows the manufacture of cast, moulded, cut or extruded confectionery products.

In practice, this sweetening mass, considered on the dry basis, will represent from 60 to 96%, preferably from 70 to 90%, and more preferably from 75 to 88% of the confectionery as marketed.

The confectionery in accordance with the invention may optionally comprise viscosity-promoting agents (gum arabic, gelatin, modified starches, maltodextrins, carrageenans, agar, pectin, and the like), emulsifying agents, humectants (sorbitol, glycerin), diary products (powdered milk, milk proteins, concentrated milk, milk, and the like), egg white, intense sweeteners (aspartame, acesulfame, saccharin, cyclamates, and the like), flavourings and air.

As regards the gelatins, the capacity to give thick gels, that is to say for persons skilled in the art the bloom value, will be taken into account in the doses. Thus, gelatins with very high bloom values will be preferably chosen when it is desired to limit the protein supply or obtain an elastic texture. There will also be nothing, by contrast, to preclude using proteins as bulking products, as for example in the case of dietetic or pharmaceutical confectionery products. Gelatins of low blooms, milk proteins and egg white will therefore be preferably chosen.

The agents which have just been described will preferably represent at most 15% by weight of the confectionery as marketed.

The confectionery products in accordance with the invention, such as in particular chewy pastes, caramels, toffees, fudges and nougats, will also comprise, as is customary for conventional formulations, fats in appropriate proportions known to persons skilled in the art. As regards its nature, it will be preferably a dairy fat or a hydrogenated vegetable oil, palm oil, copra oil or soyabean oil. This fat, for organoleptic reasons, will advantageously possess a melting point which is substantially in the region of the buccal temperature, and will be preferably used at a level of between 1 and 10%.

The use of an emulsifier will be optional, in particular when high contents of proteins will be present. Nevertheless, should the fat be used in a nonnegligible quantity in the formulation of confectionery products according to the invention, it will always be preferable to envisage its addition at a level of 0.1 to 2% relative to the confectionery. This emulsifier may be chosen in particular from lecithins, fatty esters of glycerol, sucrose or sorbitol.

The confectionery products in accordance with the invention have in addition and in general a water content varying between 3 and 20%, and preferably between 4 and 17%. Rather high values will be chosen for chewy pastes, caramels or nougats. It should be noted that compared with conventional recipes, their water contents are much higher.

The high viscosity of the branched maltodextrins (of the order of 193.3 mPa.s in solution at 50% dry matter and at 20° C.) indeed makes it possible to produce sugar-free confectionery products, in particular chewy pastes and caramels, at very high residual moisture levels and at high Aw (water activity) values. Advantageously, the Aw is greater than 0.4, preferably greater than 0.5, and more preferably greater than 0.6.

The aerated and grainy confectionery products in accordance with the invention advantageously have the characteristic of being capable of being prepared according to conventional processes already in place in industries.

Excellent results were thus obtained when the sugar-free confectionery in accordance with the invention is chewy paste comprising, in addition to gelatin, a sweetening mass comprising a polyol chosen from the group consisting of erythritol, mannitol and maltitol and branched maltodextrins in the proportions mentioned above.

What is moreover remarkable is that the nature and the quantity of the polyol may be chosen according to the texture desired for the chewy paste.

What is even more remarkable is that it is possible to replace all or part of the gelatin with branched maltodextrins having between 15 and 35% of 1→6 glucoside linkages, a reducing sugar content of less than 20%, preferably of between 2 and 5%, a polymolecularity index of less than 5 and a number-average molecular mass Mn at most equal to 4500 g/mol and preferably of between 2000 and 3000 g/mol.

Excellent results have also been obtained when the sugar-free confectionery in accordance with the invention is a caramel, as is exemplified below.

Other characteristics and advantages of the invention will emerge clearly on reading the examples which follow, which are given by way of illustration and without limitation.

EXAMPLE 1

Chewy Paste with Gelatin

A—Formula

|   |   | Composition by weight | Composition finished product (%) |
|---|---|---|---|
| A) | Branched maltodextrins | 595.0 | 69.7% |
|    | Erythritol | 76.0 | 9.4% |
|    | Water | 252.0 | — |
| B) | Vegetable fat (Toffita/Loders Croklaan) | 40.0 | 4.9% |
|    | Glycerol monostearate | 4.0 | 0.5% |
| C) | Gelatin (type A - 180 blooms) | 8.0 | 1.0% |
|    | Water | 12.0 | — |
| D) | Acesulfame K | 0.7 | 0.1% |
|    | Cherry flavour | 7.0 | 0.9% |
|    | Citric acid solution (50% DM) | 5.3 | 0.3% |
|    | Red colouring | q.s. | — |
|    | Residual water | — | 13.2% |
|    |   | 1000.0 | 100.0% |

B—Method of Preparation

Cook the mixture (A) at 110° C. (Brix=85.2) at atmospheric pressure.

Allow to cool while mixing and add the mixture B (previously melted at 60° C.), the gelatin solution (C maintained at 60° C.) and then D when the temperature of the mixture reaches 60° C.

Cool the paste.

Pull the paste (1 min, that is 50 revolutions of the arm of the pulling machine).

Form.

Cut and wrap.

C.—Remark

Aw at 20° C.=0.60

The final Brix=87.6

EXAMPLE 2

Gelatin-Free Chewy Paste

A—Formula

|   |   | Composition by weight | Composition finished product (%) |
|---|---|---|---|
| A) | Branched maltodextrins | 595.0 | 68.9% |
|    | Erythritol | 76.0 | 9.3% |
|    | Water | 264.0 | — |
| B) | Vegetable fat (Toffita/Loders Croklaan) | 48.0 | 5.9% |
|    | Glycerol monostearate | 4.0 | 0.5% |
| C) | Acesulfame K | 0.7 | 0.1% |
|    | Cherry flavour | 7.0 | 0.9% |
|    | Citric acid solution (50% DM) | 5.3 | 0.3% |
|    | Red colouring | q.s. | — |
|    | Residual water | — | 14.2% |
|    |   | 1000.0 | 100.0% |

B—Method of Preparation

Cook the mixture (A) at 108° C. (Brix=83.5) at atmospheric pressure.

Allow to cool while mixing and add the mixture B (previously melted at 60° C.), and then C when the temperature of the mixture reaches 60° C.

Cool the paste.

Pull the paste (1 min, that is 50 revolutions of the arm of the pulling machine).

Form.

Cut and wrap.

C.—Remark

Aw at 20° C.=0.63

The final Brix=85.7

EXAMPLE 3

Chewy Paste with Mannitol

A—Formula

|   |   | Composition by weight | Composition finished product (%) |
|---|---|---|---|
| A) | Branched maltodextrins | 595.0 | 67.3% |
|    | Mannitol 60 | 72.0 | 8.6% |
|    | Water | 252.0 | — |
| B) | Vegetable fat (Toffita/Loders Croklaan) | 40.0 | 4.8% |
|    | Glycerol monostearate | 4.0 | 0.5% |
| C) | Gelatin (type A - 180 blooms) | 8.0 | 1.0% |
|    | Water | 12.0 | — |
| D) | Mannitol 35 | 4.0 | 0.5% |
|    | Acesulfame K | 0.7 | 0.1% |
|    | Cherry flavour | 7.0 | 0.8% |
|    | Citric acid solution (50% DM) | 5.3 | 0.3 |
|    | Red colouring | q.s. | q.s. |
|    | Residual water | — | 16.1% |
|    |   | 1000.0 | 100.0% |

B—Method of Preparation

Cook the mixture (A) at 160° C. (Brix=84.2) at atmospheric pressure.

Allow to cool while mixing and add the mixture B (previously melted at 60° C.), the gelatin solution (C maintained at 60° C.) and then the mixture D when the temperature of the mixture reaches 60° C.

Cool the paste.

Pull the paste (1 min, that is 50 revolutions of the arm of the pulling machine).

Form

Cut and wrap.

C.—Remark

Aw at 20° C.=0.74

The final Brix=85.2

EXAMPLE 4

Chewy Paste with Maltitol

A—Formula

|   |   | Composition by weight | Composition finished product (%) |
|---|---|---|---|
| A) | Branched maltodextrins | 595.0 | 67.0% |
|    | MALTISORB ® P200 maltitol | 76.0 | 9.0% |
|    | Water | 252.0 | — |
| B) | Vegetable fat (Toffita/Loders Croklaan) | 40.0 | 4.8% |
|    | Glycerol monostearate | 4.0 | 0.5% |

-continued

|   |   | Composition by weight | Composition finished product (%) |
|---|---|---|---|
| C) | Gelatin (type A - 180 blooms) | 8.0 | 0.9% |
|   | Water | 12.0 | — |
| D) | Acesulfame K | 0.7 | 0.1% |
|   | Cherry flavour | 7.0 | 0.8% |
|   | Citric acid solution (50% DM) | 5.3 | 0.3% |
|   | Red colouring | q.s. | q.s. |
|   | Residual water | — | 16.6% |
|   |   | 1000.0 | 100.0% |

B—Method of Preparation

Cook the mixture (A) at 104° C. (Brix=84.6) at atmospheric pressure.

Allow to cool while mixing and add the mixture B (previously melted at 60° C.), the gelatin solution (C, maintained at 60° C.), and then the mixture D when the temperature of the mixture reaches 60° C.

Cool the paste.

Pull the paste (1 min, that is 50 revolutions of the arm of the pulling machine).

Form.

Cut and wrap.

C.—Remark

Aw at 20° C.=0.64

The final Brix=84.3

EXAMPLE 5

Caramel

A—Formula

|   |   | Composition by weight | Composition finished product (%) |
|---|---|---|---|
| A) | Branched maltodextrins | 595.0 | 68.3% |
|   | Erythritol | 76.0 | 9.2% |
|   | Water | 264.0 | — |
| B) | Vegetable fat (Toffita/Loders Croklaan) | 48.0 | 5.8% |
|   | Glycerol monostearate | 4.0 | 0.5% |

-continued

|   |   | Composition by weight | Composition finished product (%) |
|---|---|---|---|
| C) | Acesulfame K | 0.7 | 0.1% |
|   | Caramel flavour (Fontarome - 50398) | 7.0 | 0.8% |
|   | Caramel colouring E 241 | 5.3 | 0.6% |
|   | Residual water | — | 15.0% |
|   |   | 1000.0 | 100.0% |

B—Method of Preparation

Cook the mixture (A)+the mixture (B) (previously melted at 60° C.) at 180° C. (Brix=84.5) at atmospheric pressure.

During cooking, add the mixture C.

Cool.

Form.

Cut and wrap.

C.—Remark

Aw at 20° C.=0.57

What is claimed is:

1. Chewy paste which comprises a sweetening mass comprising branched maltodextrins having between 15 and 35% of 1→6 glucoside linkages, a reducing sugar content of less than 20%, a polymolecularity index of less than 5 and a number-average molecular mass Mn at most equal to 4500 g/mol, gelatin and at least one polyol chosen from the group consisting of erythritol, mannitol, isomalt, lactitol and maltitol, the said branched maltodextrins constituting from 0.5 to 75% of the sweetening mass, and the said polyol constituting at most 13.5% of the sweetening mass which it comprises.

2. The chewy paste of claim 1, wherein all or part of the gelatin is replaced with branched maltodextrins having between 15 and 35% of 1→6 glucoside linkages, a reducing sugar content of less than 20%, a polymolecularity index of less than 5 and a number-average molecular mass Mn at most equal to 4500 g/mol.

3. The chewy paste of claim 2, wherein the said branched maltodextrins have a reducing sugar of between 2 and 5%.

4. The chewy paste of claim 3, wherein the said branched maltodextrins have a number-average molecular mass Mn of between 2000 and 3000 g/mol.

5. The chewy paste of claim 1, wherein all or some of the maltodextrins are hydrogenated.

* * * * *